United States Patent
Sportelli

(10) Patent No.: US 10,549,332 B2
(45) Date of Patent: Feb. 4, 2020

(54) PRODUCTION PROCESS FOR STAMPED PARTS OF HIGH MECHANICAL RESISTANCE, THROUGH CONTROLLED ELECTRIC HEATING

(71) Applicant: Aethra Sistemas Automotivos S/A, Betim (BR)

(72) Inventor: Pietro Sportelli, Betim (BR)

(73) Assignee: AETHRA SISTEMAS AUTOMOTIVOS S/A, Betim (BR)

( * ) Notice: Subject to any disclaimer, the term of this patent is extended or adjusted under 35 U.S.C. 154(b) by 306 days.

(21) Appl. No.: 15/421,981

(22) Filed: Feb. 1, 2017

(65) Prior Publication Data

US 2018/0099324 A1 Apr. 12, 2018

(30) Foreign Application Priority Data

Oct. 11, 2016 (BR) .............................. 102016023753

(51) Int. Cl.
| | |
|---|---|
| *B21D 22/02* | (2006.01) |
| *B21D 37/16* | (2006.01) |
| *C21D 1/42* | (2006.01) |
| *C21D 1/673* | (2006.01) |
| *B21D 22/20* | (2006.01) |
| *C21D 1/40* | (2006.01) |
| *B21J 1/06* | (2006.01) |
| *C21D 9/46* | (2006.01) |

(52) U.S. Cl.
CPC ........... *B21D 22/022* (2013.01); *B21D 37/16* (2013.01); *C21D 1/42* (2013.01); *C21D 1/673* (2013.01); *B21D 22/02* (2013.01); *B21D 22/20* (2013.01); *B21D 22/201* (2013.01); *B21J 1/06* (2013.01); *C21D 1/40* (2013.01); *C21D 9/46* (2013.01)

(58) Field of Classification Search
CPC .... B21D 22/022; B21D 22/20; B21D 22/201; B21D 22/02; B21D 37/16; B21J 1/06; C21D 1/40; C21D 1/42; C21D 1/673; C21D 9/46
USPC ....................................................... 72/342.1
See application file for complete search history.

(56) References Cited

U.S. PATENT DOCUMENTS

| | | | | |
|---|---|---|---|---|
| 6,742,374 | B2 * | 6/2004 | Ozawa ........................ | B21J 1/06 72/342.4 |
| 7,028,519 | B2 * | 4/2006 | Kim ...................... | B21D 26/021 72/57 |
| 7,112,249 | B2 * | 9/2006 | Schroth ................ | B21D 26/021 148/511 |
| 8,069,697 | B2 * | 12/2011 | Kurisu .................. | B21D 22/022 72/342.3 |
| 8,459,084 | B2 * | 6/2013 | Krajewski ............ | B21D 22/201 148/714 |
| 8,496,764 | B2 * | 7/2013 | Luckey .................. | B21D 37/16 148/697 |

(Continued)

*Primary Examiner* — David B Jones
(74) *Attorney, Agent, or Firm* — B. Aaron Schulman, Esq.; Stites & Harbison PLLC

(57) ABSTRACT

A production process for stamped parts carried out from bales of sheets (1), a first moving robot (2), a heating device (3) with a liquid cooling unit (4), a second moving robot (4), a hydraulic press (5) with a specific molding tool, a third moving robot (6), and a conveyor belt (8), controlled by an electronic control unit. Said specific molding tool is provided with channels for cooling done through heat exchange, via water circulation, where the cooling rate is controlled by means of the liquid's flow and temperature control.

5 Claims, 1 Drawing Sheet

(56) References Cited

U.S. PATENT DOCUMENTS

| | | | |
|---|---|---|---|
| 9,321,092 B2 * | 4/2016 | Takasue | B21D 22/022 |
| 2002/0069506 A1 * | 6/2002 | Brodt | B21D 37/16 |
| | | | 29/505 |
| 2013/0111966 A1 * | 5/2013 | Takasue | B21D 22/02 |
| | | | 72/360 |

* cited by examiner

PRODUCTION PROCESS FOR STAMPED PARTS OF HIGH MECHANICAL RESISTANCE, THROUGH CONTROLLED ELECTRIC HEATING

FIELD OF THE INVENTION

This invention, relating to the metallurgical industry, particularly in the field of auto parts, is about a production process for stamped parts, which shows a significant improvement in efficiency, by means of controlled electric heating.

BACKGROUND OF THE INVENTION

The production of stamped parts of high hardness from the high temperature forming process consists of heating a metal sheet (specific material) and then hardening of this material, by transforming the microstructure of the metallic material to conditions of higher hardness through quick cooling of the sheet already formed into its final shape inside the tool. This requires heating the plate from room temperature to the temperature called austenitizing temperature of the material, when its microstructure will have been transformed into austenite.

In this process, after heating, the work piece is conveyed automatically to a stamping mold located inside a press. The mold or tool, as is its technical denomination, has in its interior channels where a cooling liquid circulates to carry out the heat exchange with the assembly (tool+plate) and to promote its rapid cooling. Upon completion of cooling, the stamped part having a high hardness is then removed by an automated system and made available for the next operation, surface cleaning operation or laser cutting operation.

In the current state of the art, several types of specific equipment are used for heating, among them equipment that do heating by radiation, burning of fuel (commonly natural or LPG), electric heating (resistances) and heating through electric induction.

In equipment that use fuel heating, electric heating or mixed (electric+fuel) heating options of continuous furnaces, in which the part goes through a long path inside the furnace (over 10 meters in length), the part receives throughout the course the heat generated by fuel burning or by heating of electrical resistances, thus raising its temperature until it reaches the desired temperature at the furnace outlet. Usually these furnaces have zones with different and increasing temperatures, to which the plate is exposed along the path equaling its temperature with the temperature of each zone.

Stationary furnaces can also be used, where the part is deposited through a hatch into a chamber heated to high temperature, remaining there for a certain time until reaching the desired temperature when, when the hatch is opened and the piece is removed from inside the chamber.

In induction heating, the heat in the part is generated through an electric current by means of inducting an electric current on the plate by a coil (in which circulates a determined electric current) placed around the part to then generate an electric current in its inside and consequently its heating. This furnace may also be continuous or stationary, where in the continuous furnace the piece is led by a conveyor belt close to the heating coil, entering from one side at ambient temperature and leaving the other end at the desired temperature. In the stationary furnace the part is deposited in a chamber where the coils are located, and upon reaching the required temperature the piece is withdrawn from the interior.

In analyzing the existing equipment, it has been observed that in the case of continuous fuel and electric furnaces, as well as in continuous induction furnaces, there is a large consumption of space due to the length of the course required to be traveled in order to raise the temperature of the product. Thus, physical space occupied in the shed is large and impairs accommodation of other productive processes, storage, feasibility of logistical improvements, etc.

Another point observed is the heating rate, which affects the time required for heating and has a great impact on the productivity of a process. In the case of radiation heating, heating rates of approximately 6.5° C./sec can be achieved and in cases of induction heating, heating rates of 200° C./sec can be achieved.

As well as the previously mentioned shortcomings, energy consumption from inefficiencies in the heating process may generate a high cost of production for the company, and a more efficient process is always necessary so that costs can be reduced. In the case of radiation heating, the efficiency of a continuous furnace is approximately 26% and for induction heating this value lies between 40 and 60%.

SUMMARY OF THE INVENTION

To the extent of improving these rates and increasing heating efficiency, the present invention provides a heating process by conduction (heating by Joule effect), which uses a small size heating device, occupying a smaller area and thus providing a better utilization of the area used by the production line, and furthermore allowing heating up to 400° C./sec, with a speed higher than twice as fast as induction heating and 61 times faster than radiation heating. Thus, with regard to the efficiency of the process, i.e. the efficiency of energy utilization to carry out the heating of the plate, heating by conduction can reach 87%, promoting a major economy in costs of transforming metal sheets.

After heating in the actual stamping operation, a hydraulic press is normally used with a force equivalent to that required by the respective stamping process, part and tool. The cooling takes place by the circulation of a liquid, usually water, cooled to approximately 8° C. by a cooling equipment of high thermal capacity. For some situations the liquid temperature may be lower so mixing some additive to the water may be needed so that it does not freeze at the working temperature of the equipment.

Moving both hot and cold parts can be done by both robotic arms and dedicated moving "transfer" systems designed specifically for the applications and in the case of hot part moving they are constructed of material that supports temperature and radiation from the plate without getting damaged.

The heating method used in the process in question is more energy efficient than other heating elements normally used to raise the temperature of the work piece to be tool hardened, thus having a better cost as regards the operating costs of the equipment. Also because it promotes the rapid heating of the parts, it is possible to decrease the quantities of parts in process and the space occupied due to the characteristics of the equipment and of the applied process.

The heating of plates by joule effect, used in the product in question, has a high energy efficiency, around 80 to 90%. Together with the control and moving systems of the parts, it promotes a production line that is more energy-efficient, space-efficient and with shorter cycle times.

The production process for high-strength parts through automatic controlled electric heating subject of this invention, may be better understood by reporting to the enclosed figures, which are part of this descriptive report and contain numerical references together with the description of their technical particularities. These figures do not restrict their configuration as to their dimensions, proportions and possible types of finishing inserted nor the scope of their practical application.

DETAILED DESCRIPTION OF THE INVENTION

Figure 1:
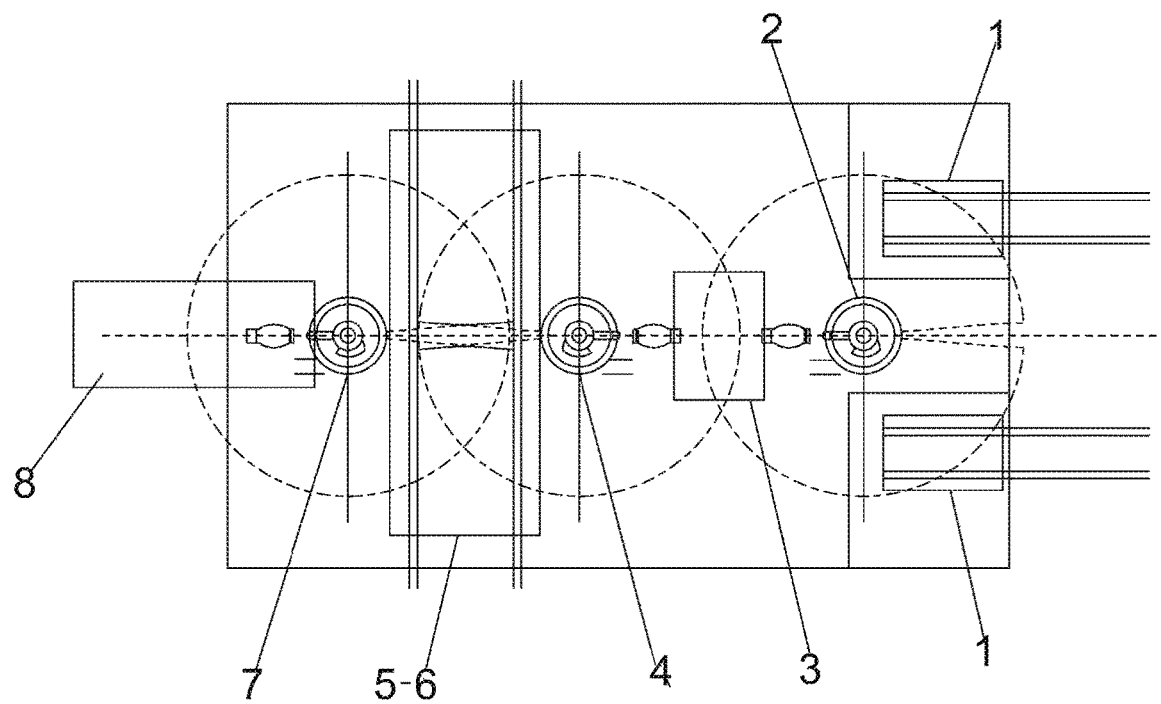
FIG. 1 is a top view illustration of the equipment involved in the process.
Figure 2:
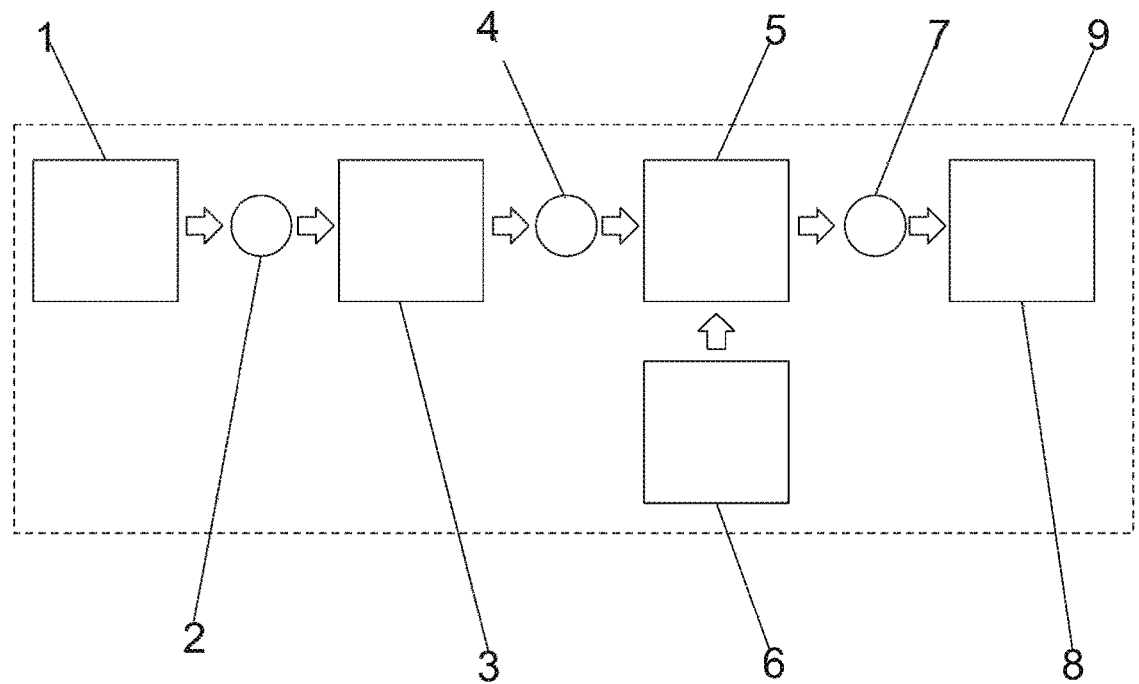
FIG. 2 is a flowchart of the process, showing its operational phases.

According to these figures and their numerical references, the subject of this invention relates to a production process for high-strength parts through automatic controlled electric heating using a tool hardening procedure (mold and press). Said process is implemented from bales of feed sheets (1), a first moving robot (2), a heating device (3), a second moving robot (4), a specific molding tool (5) with a liquid cooling unit (6), a third moving robot (7), a hydraulic press (8). All equipment is controlled by an electronic control unit (9).

In practice, the pieces, in the form of plates of various shapes (with or without defined figures), are fed to the production line automatically through bales of sheets (1), being moved by the first manipulation robot (2), which withdraws one plate at a time and deposits it in the electric heating equipment (3). This electric heating equipment (3) employs the joule heating theory raising the temperature of the plate to values around 900° C., more efficiently, with less energy expenditure and faster. The heated part is then transferred via the second manipulating robot (4) into a specific stamping tool (5) cooled by a cooling unit (6) contained in a hydraulic press (8) via a third moving robot (7), all the equipment being controlled by an electronic control unit (9).

Said specific stamping tool (5) provided with a liquid cooling unit (5) containing channels for cooling, by heat exchange, via water circulation, which removes the thermal energy from the stamped product in a quick manner to promote the phase change of its microstructure and the consequent hardening of the material.

The cooling is carried out at a temperature of approximately 5° C. in the channels, the water being generated from an ice water unit with high nominal capacity. The cooling rate of the stamping tool is controlled to promote the required change of strength for each product by controlling the flow rate and liquid temperature circulating in the tool.

Once this step is completed, the finished product is removed from the tool by the third manipulating robot (7) and sent to the next step which may be the laser cut of the part, considering the specified geometry, or for packaging.

The invention claimed is:
1. A production process for producing a hardened stamped part from a metal sheet through controlled electric heating, comprising transferring said sheet from a bale of metal sheets via a first moving robot to an electric heating device for heating, and after heating transferring said sheet via a second moving robot to a specific molding tool, said molding tool having a liquid cooling unit and being arranged in a hydraulic press so as to form the finished part by stamping, and after said finished part is stamped, withdrawing said finished part via a third moving robot, all of said processes being controlled by an electronic control unit,
wherein said electric heating is by conduction carried out under Joule heating theory.
2. The production process according to claim 1, wherein the electric heating raises the temperature of the sheet to close to 900° C.
3. The production process according to claim 1, wherein the specific molding tool is cooled by a liquid cooling unit containing channels for cooling so as to allow heat exchange via water circulation and to promote a phase change of the microstructure of the sheet and the subsequent hardened finished part, wherein the cooling rate of the molding tool and the flow rate of the water circulation are controlled to promote the necessary change of strength for each finished part.
4. The production process according to claim 3, wherein the cooling is done at a temperature of approximately 5° C. in the channels for cooling.
5. The production process according to claim 3, wherein the cooling is provided using water generated from an ice water unit with high nominal capacity.

* * * * *